United States Patent
Shamasundar et al.

(10) Patent No.: US 10,330,493 B2
(45) Date of Patent: Jun. 25, 2019

(54) SYSTEMS AND METHODS FOR DISPLAYING POSITION SENSITIVE DATALINK MESSAGES ON AVIONICS DISPLAYS

(71) Applicant: Honeywell International Inc., Morristown, NJ (US)

(72) Inventors: Raghu Shamasundar, Karnataka (IN); Prasad Rao Piradi, Karnataka (IN); Thomas D. Judd, Woodinville, WA (US); David Pepitone, Suny City West, AZ (US); Abhishek Gupta, Karnataka (IN); Adib Bouanani, Laveen, AZ (US); Prashanth Ramanna, Karnataka (IN)

(73) Assignee: Honeywell International Inc., Morris Plains, NJ (US)

( * ) Notice: Subject to any disclaimer, the term of this patent is extended or adjusted under 35 U.S.C. 154(b) by 474 days.

(21) Appl. No.: 14/559,755

(22) Filed: Dec. 3, 2014

(65) Prior Publication Data
US 2016/0161283 A1   Jun. 9, 2016

(51) Int. Cl.
*G01C 23/00*    (2006.01)
*G06F 3/0481*   (2013.01)

(52) U.S. Cl.
CPC ......... *G01C 23/005* (2013.01); *G06F 3/0481* (2013.01)

(58) Field of Classification Search
CPC ... G08G 5/0013; G08G 5/0021; G08G 5/0047
See application file for complete search history.

(56) References Cited

U.S. PATENT DOCUMENTS

| 5,057,835 A | 10/1991 | Factor et al. |
| 5,208,590 A | 5/1993 | Pitts |
| 6,154,637 A | 11/2000 | Wright et al. |
| 6,160,497 A | 12/2000 | Clark |

(Continued)

FOREIGN PATENT DOCUMENTS

| EP | 2244215 A1 | 10/2010 |
| EP | 2381433 | 10/2011 |

(Continued)

OTHER PUBLICATIONS

U.S. Patent and Trademark Office, "Final Office Action", "from U.S. Appl. No. 13/794,089", dated Jan. 26, 2015, pp. 1-24, Published in: US.

(Continued)

*Primary Examiner* — Tamara L Weber
(74) *Attorney, Agent, or Firm* — Fogg & Powers LLC

(57) ABSTRACT

Systems and methods for displaying position sensitive datalink messages on avionics displays are provided. In one embodiment, a flight deck instrument display system for an aircraft comprises: a flight plan display screen that displays a graphical representation of at least a part of an aircraft's planned flight path together with symbology representing a position of the aircraft with respect to the aircraft's planned flight path; wherein the flight plan display screen further displays at least one symbol positioned along the graphical representation of at least a part of the aircraft's planned flight path that indicates a point of applicability for a received uplink datalink message.

16 Claims, 11 Drawing Sheets

(56) References Cited

U.S. PATENT DOCUMENTS

| | | | |
|---|---|---|---|
| 6,501,392 | B2 | 12/2002 | Gremmert et al. |
| 6,661,353 | B1 | 12/2003 | Gopen |
| 6,700,482 | B2 | 3/2004 | Ververs et al. |
| 6,828,921 | B2 | 12/2004 | Brown et al. |
| 6,832,138 | B1 | 12/2004 | Straub et al. |
| 7,103,455 | B2* | 9/2006 | Subelet ............... G01C 23/005 244/175 |
| 7,177,731 | B2 | 2/2007 | Sandell et al. |
| 7,272,471 | B1 | 9/2007 | Palich et al. |
| 7,312,725 | B2 | 12/2007 | Berson et al. |
| 7,363,119 | B2 | 4/2008 | Griffin, III et al. |
| 7,787,999 | B1* | 8/2010 | Barber ................ G01C 23/005 340/988 |
| 7,876,238 | B2 | 1/2011 | Vandenbergh et al. |
| 8,014,907 | B2 | 9/2011 | Coulmeau |
| 8,164,487 | B1 | 4/2012 | Tsai |
| 8,195,347 | B2 | 6/2012 | Boorman |
| 8,285,427 | B2 | 10/2012 | Rogers et al. |
| 8,321,069 | B2 | 11/2012 | Vasek et al. |
| 8,335,988 | B2 | 12/2012 | Fahy |
| 8,417,396 | B2 | 4/2013 | Goodman et al. |
| 8,423,272 | B2 | 4/2013 | Judd et al. |
| 8,560,148 | B2 | 10/2013 | Torres et al. |
| 8,594,931 | B2 | 11/2013 | Sterkel et al. |
| 8,639,401 | B2 | 1/2014 | Bailey et al. |
| 8,686,878 | B2 | 4/2014 | Whitlow et al. |
| 8,760,319 | B2 | 6/2014 | Kommuri et al. |
| 9,019,128 | B1 | 4/2015 | Kim |
| 9,132,913 | B1* | 9/2015 | Shapiro .................. B64C 19/00 |
| 2003/0004619 | A1 | 1/2003 | Carriker et al. |
| 2003/0193408 | A1* | 10/2003 | Brown ................ G08G 5/0086 340/945 |
| 2003/0193411 | A1 | 10/2003 | Price |
| 2004/0059472 | A1 | 3/2004 | Hedrick |
| 2004/0254691 | A1 | 12/2004 | Subelet |
| 2005/0049762 | A1 | 3/2005 | Dwyer |
| 2005/0203676 | A1* | 9/2005 | Sandell ............... G08G 5/0052 701/3 |
| 2006/0129286 | A1* | 6/2006 | King .................. G01C 23/005 701/4 |
| 2007/0200731 | A1 | 8/2007 | Winkler et al. |
| 2007/0219679 | A1* | 9/2007 | Coulmeau ............ G08G 5/0039 701/3 |
| 2008/0027629 | A1 | 1/2008 | Peyrucain et al. |
| 2010/0153875 | A1 | 6/2010 | O'Flynn et al. |
| 2011/0166772 | A1 | 7/2011 | Ferro et al. |
| 2011/0246053 | A1 | 10/2011 | Coulmeau et al. |
| 2011/0264313 | A1 | 10/2011 | Sampath |
| 2012/0191341 | A1 | 7/2012 | Nara et al. |
| 2012/0215388 | A1* | 8/2012 | Pepitone ............. G08G 5/0021 701/14 |
| 2013/0027226 | A1* | 1/2013 | Cabos ................. G08G 5/0013 340/961 |
| 2013/0080043 | A1 | 3/2013 | Bailin et al. |
| 2013/0085669 | A1 | 4/2013 | Bailey et al. |
| 2013/0249712 | A1* | 9/2013 | Buratto ............... G08G 5/0091 340/971 |
| 2014/0253585 | A1 | 9/2014 | Paul Dominic et al. |
| 2014/0309821 | A1* | 10/2014 | Poux .................. G08G 5/0021 701/14 |
| 2014/0320417 | A1* | 10/2014 | Pakki .................. G06F 3/0238 345/172 |
| 2015/0002316 | A1* | 1/2015 | Sridhar ................ B64D 43/00 340/953 |
| 2016/0019794 | A1* | 1/2016 | Dominic .............. G08G 5/0013 701/484 |
| 2016/0047674 | A1* | 2/2016 | Ramaiah ............. G01C 23/005 340/995.27 |

FOREIGN PATENT DOCUMENTS

| | | |
|---|---|---|
| EP | 2506237 | 10/2012 |
| FR | 2844893 A1 | 3/2004 |
| WO | 2009046462 | 4/2009 |
| WO | 2011128835 | 10/2011 |

OTHER PUBLICATIONS

U.S. Patent and Trademark Office, "Office Action", "from U.S. Appl. No. 13/794,089", dated Oct. 10, 2014, pp. 1-28, Published in: US.

Adams et al "Incorporating Data Link Messaging Into a Multi-Function Display for General Aviation Aircraft", "25th International Congress of the Aeronautical Sciences", 2006, pp. 1-9.

Baxley et al., "Use of Data Comm by Flight Crew in High-Density Terminal Areas", "American Institute of Aeronautics and Astronautics", Sep. 2010, pp. 1-14.

Mueller, "Experimental Evaluation of an Integrated Datalink and Automation-Based Strategic Trajectory Concept", "7th AIAA Aviation Technology, Integrated and Operations Conference", Sep. 18-20, 2007, pp. 1-15, Publisher: American Institute of Aeronautics and Astronautics.

U.S. Patent and Trademark Office, "Office Action", "from U.S. Appl. No. 14/334,568", dated Oct. 20, 2015, pp. 1-27, Published in: US.

U.S. Patent and Trademark Office, "Final Office Action", "from U.S. Appl. No 13/794,089", dated Oct. 1, 2015, pp. 1-28, Published in: US.

U.S. Patent and Trademark Office, "Office Action", "from U.S. Appl. No. 13/794,089", dated May 29, 2015, pp. 1-26, Published in: US.

U.S. Patent and Trademark Office, "Advisory Action", "from U.S. Appl. No. 13/794,089", dated Apr. 2, 2015, pp. 1-10, Published in: US.

U.S. Patent and Trademark Office, "Advisory Action", "U.S. Appl. No. 13/794,089", dated Dec. 23, 2015.

U.S. Patent and Trademark Office, "Office Action", "U.S. Appl. No. 13/794,089", dated Apr. 4, 2016.

U.S. Patent and Trademark Office, "Office Action", "U.S. Appl. No. 14/334,568", dated Apr. 1, 2016.

U.S. Patent and Trademark Office, "Final Office Action", "U.S. Appl. No. 14/334,568", dated Aug. 29, 2016, pp. 1-16, Published in: US.

U.S. Patent and Trademark Office, "Final Office Action", "U.S. Appl. No. 13/794,089", dated Aug. 3, 2016, pp. 1-39, Published in: US.

European Patent Office, "Communication Pursuant to Article 94(3) for EP Application No. 14157403.8", "from U.S. Appl. No. 13/794,089", Jul. 29, 2014, pp. 1-9, Published in: EP.

European Patent Office, "European Search Report for EP Application No. 141574018", "from U.S. Appl. No. 13/794,089", Jul. 11, 2014, pp. 1-4, Published in: EP.

European Patent Office, "Summons to Attend Oral Proceedings Pursuant to Rule 115(1) for EP Application No. 14157403.8", "from U.S. Appl. No. 13/794,089", Apr. 25, 2017, pp. 1-12, Published in: EP.

State Intellectual Property Office People's Republic of China, "First Office Action for CN Application No. 201410087174.6", "from U.S. Appl. No. 13/794,089", dated Dec. 26, 2016, pp. 1-18, Published in: CN.

United States Patent and Trademark Office, "Advisory Action", "from U.S. Appl. No. 14/334,568", dated Aug. 11, 2017, pp. 1-4, Published in: US.

United States Patent and Trademark Office, "Advisory Action", "from U.S. Appl. No. 14/334,568", Nov. 9, 2016, pp. 1-4, Published in: US.

United States Patent and Trademark Office, "Final Office Action", "from U.S. Appl. No. 14/334,568", Jun. 9, 2017, pp. 1-20, Published in: US.

(56) References Cited

OTHER PUBLICATIONS

United States Patent and Trademark Office, "Notice of Allowance", "from U.S. Appl. No. 13/794,089", dated Oct. 26, 2016, pp. 1-21, Published in: US.
United States Patent and Trademark Office, "Notice of Allowance", "from U.S. Appl. No. 14/334,568", dated Sep. 22, 2017, pp. 1-7, Published in: US.
United States Patent and Trademark Office, "Office Action", "from U.S. Appl. No. 14/334,568", Jan. 10, 2017, pp. 1-15, Published in: US.

* cited by examiner

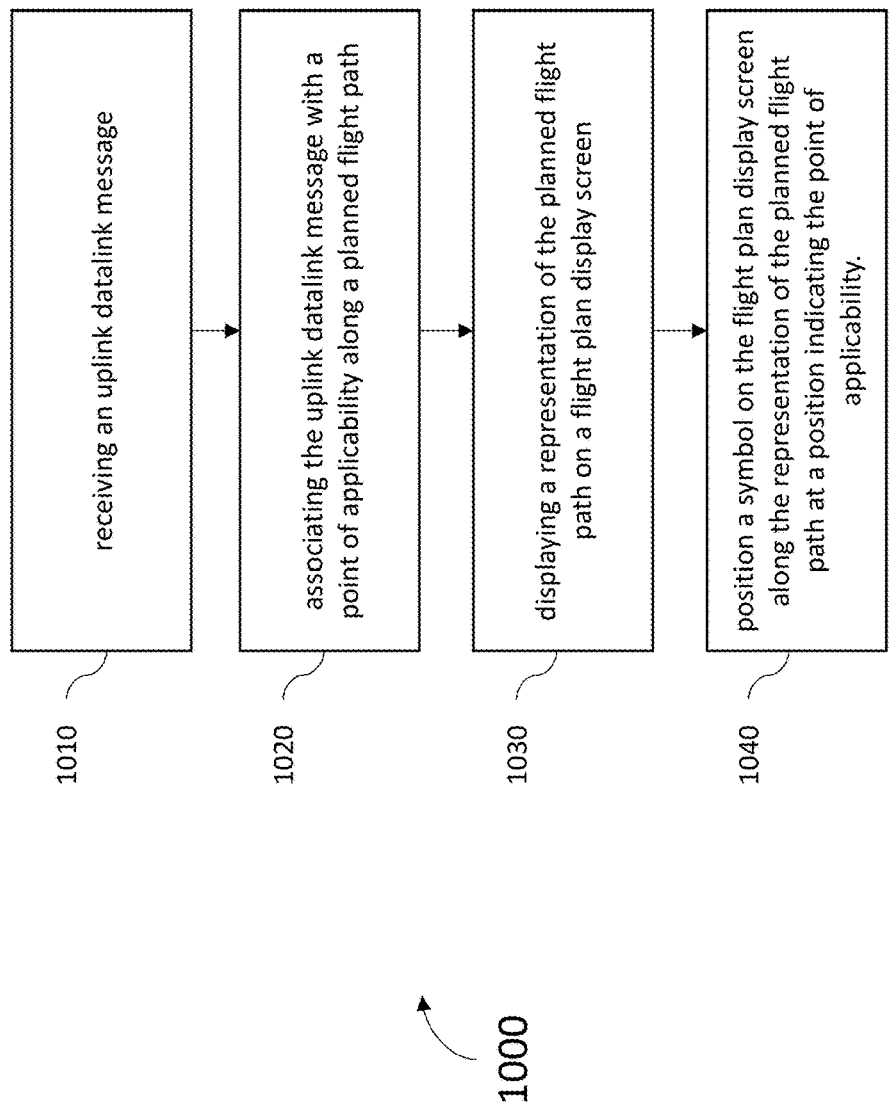

SYSTEMS AND METHODS FOR DISPLAYING POSITION SENSITIVE DATALINK MESSAGES ON AVIONICS DISPLAYS

BACKGROUND

Controller-pilot datalink communications (CPDLC) messages are one type of datalink used to exchange data between an aircraft's pilot and an air traffic controller (Air Traffic Control (ATC), for example) such as tactical changes that need to be made during flight or for any negotiations. Conventionally, uplink datalink messages are displayed to the pilot via the on-board MCDU/MFD in an ATC log page where the messages are displayed sequentially in the order they were received from the ATC ground station. As such, the order of messages displayed on the log page is not context sensitive and does not readily convey which messaged received from the ground might be applicable to the immediate waypoint. That is, a pilot will not be able to understand which part of the flight a message is applicable to the route of flight until he or she actually opens and views the message. This is not only time consuming, but potentially forces the pilot to review messages not immediately relevant before finding those that are relevant. The pilot has to manually scan through all the messages in the log to determine those that are immediately relevant, thus increasing workload & heads down time which presents unnecessary distractions.

For the reasons stated above and for other reasons stated below which will become apparent to those skilled in the art upon reading and understanding the specification, there is a need in the art for alternate systems and methods for displaying position sensitive datalink messages on avionics displays.

SUMMARY

The Embodiments of the present invention provide methods and systems for displaying position sensitive datalink messages on avionics displays and will be understood by reading and studying the following specification.

Systems and methods for displaying position sensitive datalink messages on avionics displays are provided. In one embodiment, a flight deck instrument display system for an aircraft comprises: a flight plan display screen that displays a graphical representation of at least a part of an aircraft's planned flight path together with symbology representing a position of the aircraft with respect to the aircraft's planned flight path; wherein the flight plan display screen further displays at least one symbol positioned along the graphical representation of at least a part of the aircraft's planned flight path that indicates a point of applicability for a received uplink datalink message.

DRAWINGS

Embodiments of the present invention can be more easily understood and further advantages and uses thereof more readily apparent, when considered in view of the description of the preferred embodiments and the following figures in which:

FIG. 10 is a flow chart illustrating a method of one embodiment of the present disclosure.

In accordance with common practice, the various described features are not drawn to scale but are drawn to emphasize features relevant to the present invention. Reference characters denote like elements throughout figures and text.

DETAILED DESCRIPTION

In the following detailed description, reference is made to the accompanying drawings that form a part hereof, and in which is shown by way of specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. The following detailed description is, therefore, not to be taken in a limiting sense.

Embodiments of the present disclosure provides systems and methods that display symbology for received uplink messages at points of applicability along a graphical representation of an aircraft's flight plan indicating the presence of a received uplink datalink message. By placing the symbols along the flight plan display, the pilot is provided with an immediate awareness of where during the flight a particular uplink message is applicable and a better understanding of which messages are more immediately relevant. For example, if a pilot is in the midst of a critical operation and receives an uplink message from an air traffic controller, even without opening the message the pilot can learn from the symbols on the flight display that the messages is relevant to a down path event and does not require an immediate response. The pilot is assured that he or she may delay responding to that message and concentrate on executing the present critical operation. Although the term "pilot" is used through-out to refer to an example user or flight-crew member, the term is not intended to be limiting. That is, any act, task, function, selection, etc., described herein as being associated with a pilot action could in fact be performed by any user regardless of whether the user is a pilot or non-pilot. Further, although flight plan display screens are discussed herein within the context of an on-board flight deck instrument display system and other on-board avionics, in other embodiments, a flight plan display screen having any of the features or elements discussed above may instead be implemented in an air traffic control center (such as on an ATC Controller Console or computer, for example) permitting an ATC controller to review uplink messages sent to an aircraft at points of applicability along a graphical representation of an aircraft's flight plan.

Figure 1:
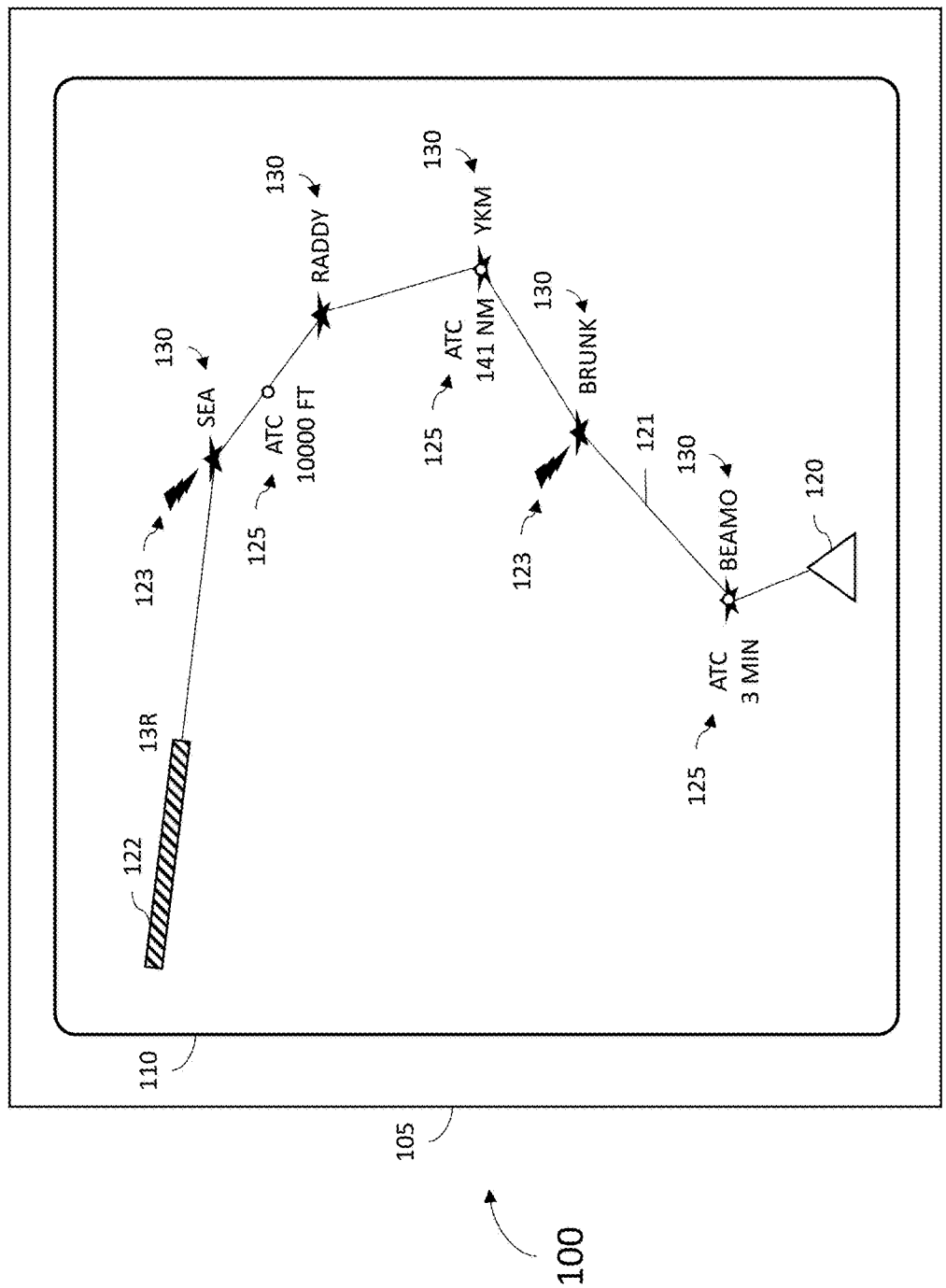
FIGS. 1-8 are example flight plan display screens for a flight deck instrument display system of one embodiment of the present disclosure.

FIG. 1 is a diagram illustrating generally at 100 a flight plan display screen 110 for a flight deck instrument display system 105. In some embodiments, the flight deck instrument display system 105 may comprise what is known in the industry as an electronic flight instrument system (EFTS) wherein the flight plan display screen 110 comprises a navigational display (ND). For example, in one embodiment, the flight deck instrument display system 105 is implemented using a Honeywell Primus Epic Interactive Navigation (INAV) avionics system. Using the flight plan display screen 110, the aircrew can overlay different information. For example, the flight plan display screen 110 shown in FIG. 1 displays symbology representing the position of the aircraft (shown at 120) with respect to the aircraft's planned flight path 121. As selectable by the pilot, flight plan display screen 110 may show only a segment of the planned flight path 121, or the entire remaining flight path. In the latter case, flight plan display screen 110 may display symbology representing the runway 122 where the aircraft is scheduled to land (which is identified as runway 13R in this example). The flight plan display screen 110 is dynamically presented, meaning that it is updated in real-time to illustrate the aircraft 120's current position relative to the flight path 121, and reflect any approved in-flight changes to the planned flight path 121. One are more waypoints 130 are also typically overlayed onto flight path 121.

With embodiments of the present disclosure, certain uplink datalink messages received from air traffic control centers are also displayed on the flight plan display screen 110. More specifically, uplink datalink messages relevant to a specific point on the planned flight path 121 are displayed onto the flight plan display screen 110 using symbology at the point along the planned flight path 121 where the message becomes applicable. In FIG. 1, such uplink datalink messages from an ATC ground station are displayed on flight plan display screen 110 as either an ATC message symbol (shown at 123) or as an ATC Conditional Clearance (ATC CC) message symbol (shown at 125). In either case, the position of the symbol 123 or 125 along the flight path 121 informs the pilot that an associated datalink message has been received that is applicable to the point on the flight path 121 where its symbol is displayed. For example, from the symbology displayed in FIG. 1, the pilot is made aware of the following: that there is ATC CC message 125 which is actionable at waypoint "BEAMO"; there is an ATC message 123 containing information relevant to the waypoint "BRUNK"; there is an ATC CC message 125 which is actionable at waypoint "YKM"; there is an ATC CC message 125 which is actionable at a position between waypoint "RADDY" and waypoint "SEA"; and there is an ATC message 123 containing information relevant to the waypoint "SEA."

Figure 2:
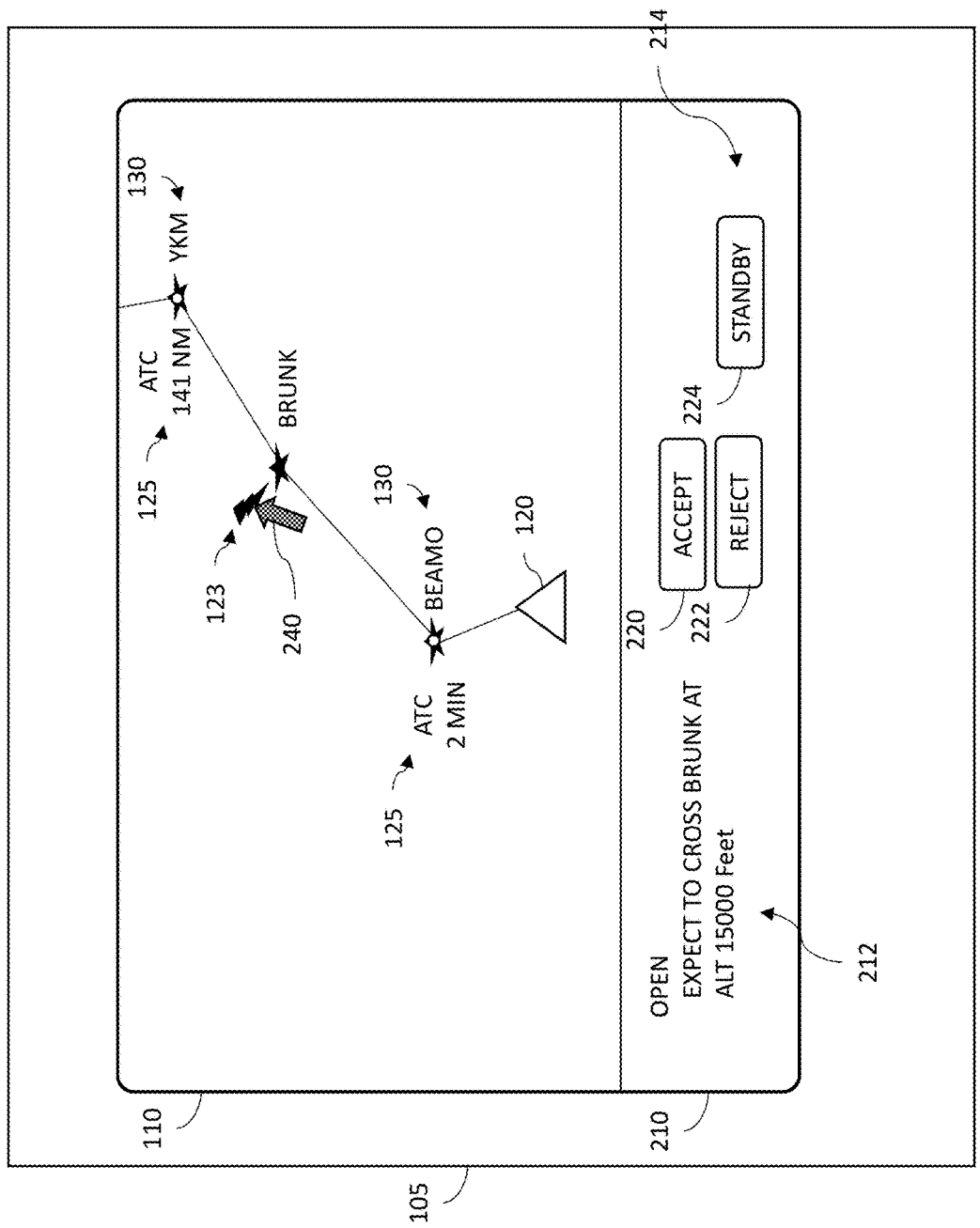
Figure 9:
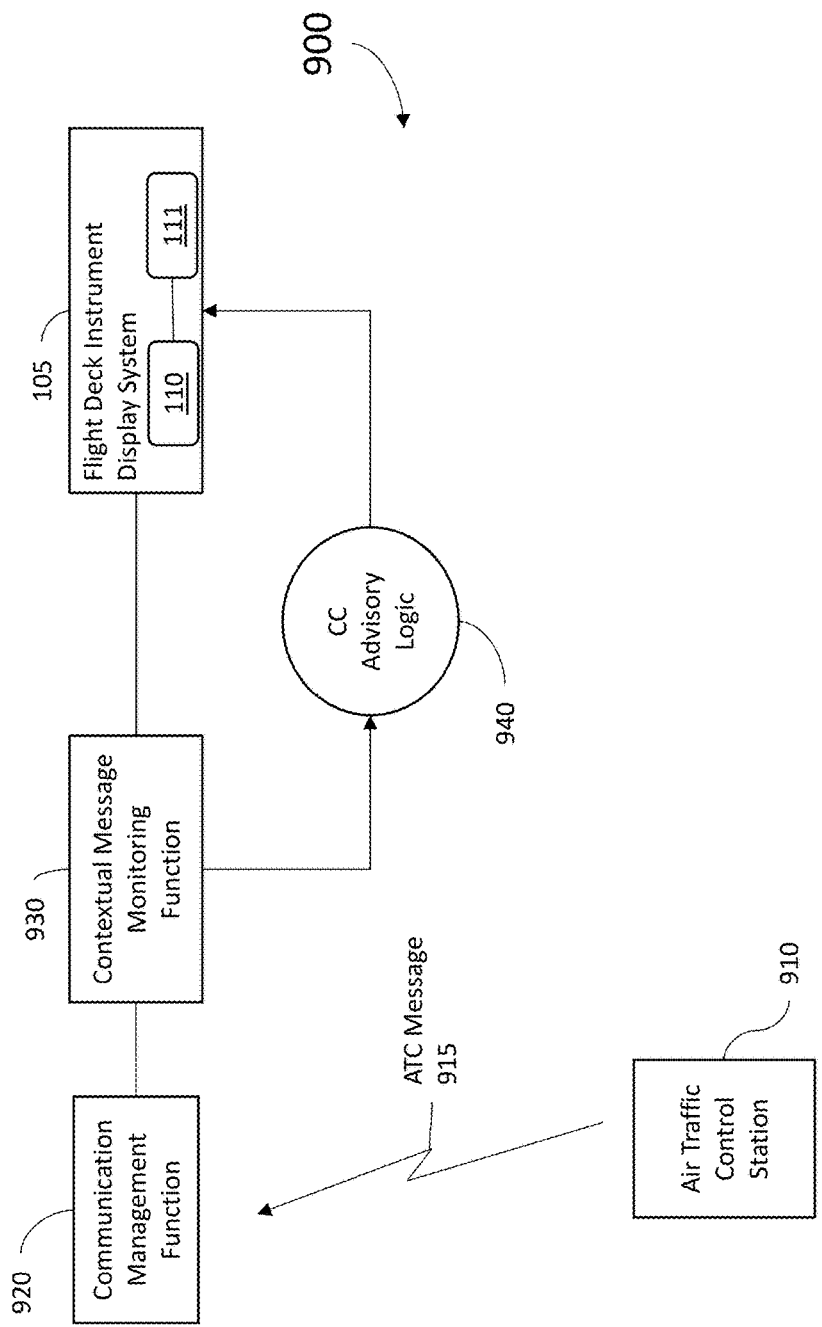
FIGS. 9 and 9A are diagrams illustrating a contextual uplink message display system of one embodiment of the present disclosure.

FIG. 2 is a diagram showing one implementation of the flight plan display screen 110 illustrating where the pilot has used positioned a cursor 240 (which may be performed using a human-machine interface 111 such as shown in FIG. 9, for example) to select an ATC message 123. More specifically, the pilot has used cursor 240 to select the ATC message symbol 123 applicable to waypoint "BRUNK." The pilot is made aware by the symbology on flight plan display screen 110 that the datalink message corresponding to that ATC message symbol 123 is relevant to waypoint "BRUNK" because the ATC message symbol 123 is positioned proximate to that waypoint's symbol. Prior to reaching waypoint "BRUNK" on the flight path, the pilot may attend to other items. That is, if the pilot is busy with some other critical operation and he receives an incoming datalink message which is indicated on the flight plan display screen 110 as being applicable further down the flight path, the pilot does not need to respond or even open the message immediately. Instead the pilot can choose to respond to it a little later when less occupied. In one embodiment, when the ATC message symbol 123 is selected using the cursor 240, a message region 210 is displayed within flight plan display screen 110 providing the contents of the datalink message (shown at 212) along with the applicable response options (also referred to as action buttons, shown 214) which are selectable by the pilot.

For example, in FIG. 2, because the pilot has used cursor 240 to select the ATC message symbol 123 proximate to waypoint "BRUNK", message region 210 is activated on the screen 110. The message region 210 presents the complete datalink message at 212, which in this example informs the pilot to "EXPECT TO CROSS BRUNK AT ALT 15000 Feet". The pilot may then select the appropriate action button to "ACCEPT" (shown at 220) or "REJECT" (shown at 222) the message, or choose "STANDBY" (shown at 224) to delay his response. Depending on the content of the messages displayed at 212, the available action buttons at 214 will vary. It should be appreciated that a wide range of different datalink messages may be processed in this manner and displayed using an ATC message symbol 123 on the flight plan display screen 110. In some embodiments, a waypoint 130 or other position data is embedded in the incoming datalink message to indicate where the message is applicable and flight plan display screen 110 automatically displays the ATC message symbol 123 at the indicated position along flight path 121 accordingly. In other embodiments, the pilot may have the option to manually place an ATC message symbol 123 associated with a specific datalink message along flightpath 121 at a point of the pilot's choosing.

A "condition clearance" (CC) is a specific type of ATC message that conveys a clearance issued by an air traffic controller which does not become effective until a specified condition has been satisfied. An ATC CC message symbol 125 along flight path 121 conveys to the pilot that there is the received datalink message applicable to that location that includes a conditional clearance. Acceptance of a conditional clearance message by the pilot indicates to the ground controllers that the pilot will adhere to the request. In the example illustrated by FIG. 1, the pilot has accepted the three ATC CC messages which are now displayed on flight plan display screen 110 by ATC CC message symbols 125. The ATC CC message symbols appear at the points along flight path 121 where the aircraft's conditional clearance advisory logic (discussed below) predicts that the condition for that clearance will be satisfied. For example, in FIG. 1 the ATC CC message symbols 125 proximate to BEAMO notifies the pilot that an ATC CC condition will be satisfied upon reaching BEAMO and therefore some action by the pilot will be required at that point. Further, given current aircraft conditions (e.g.; position, velocity, altitude, wind data) the presented symbols also inform the pilot how much margin they have until the condition is met. For example, the ATC CC message symbol 125 at BEAMO informs the pilot that this condition is expected to be satisfied in approximately 3 minutes. This margin before reaching the condition may be expressed in a variety of different units, for example, as a time margin (i.e., time remaining until the condition is met), a distance margin (i.e., the number of nautical miles (NM) until the condition is met) or an altitude margin (i.e., the estimated change in altitude needed before the condition is met).

Figure 3:
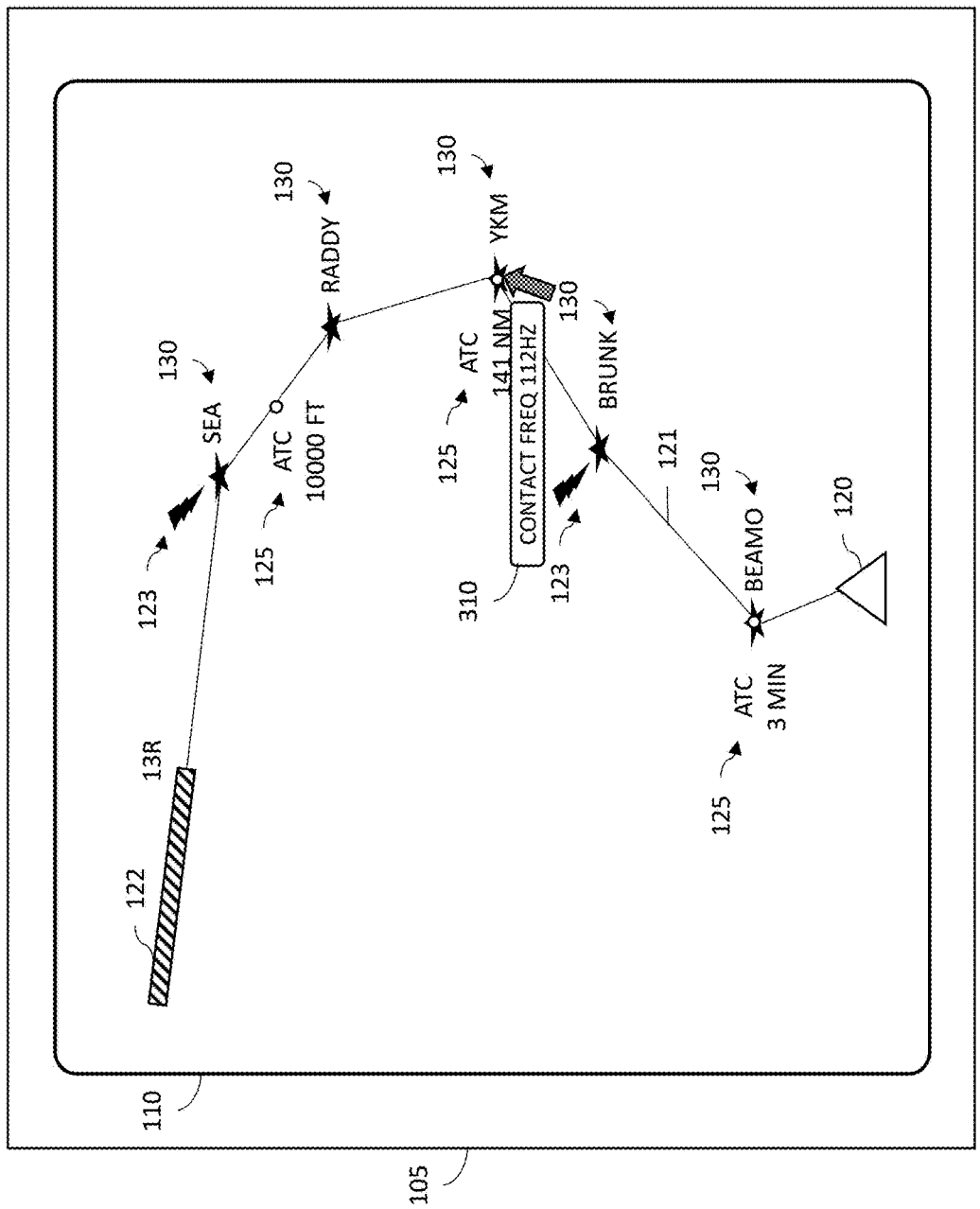
Figure 4:
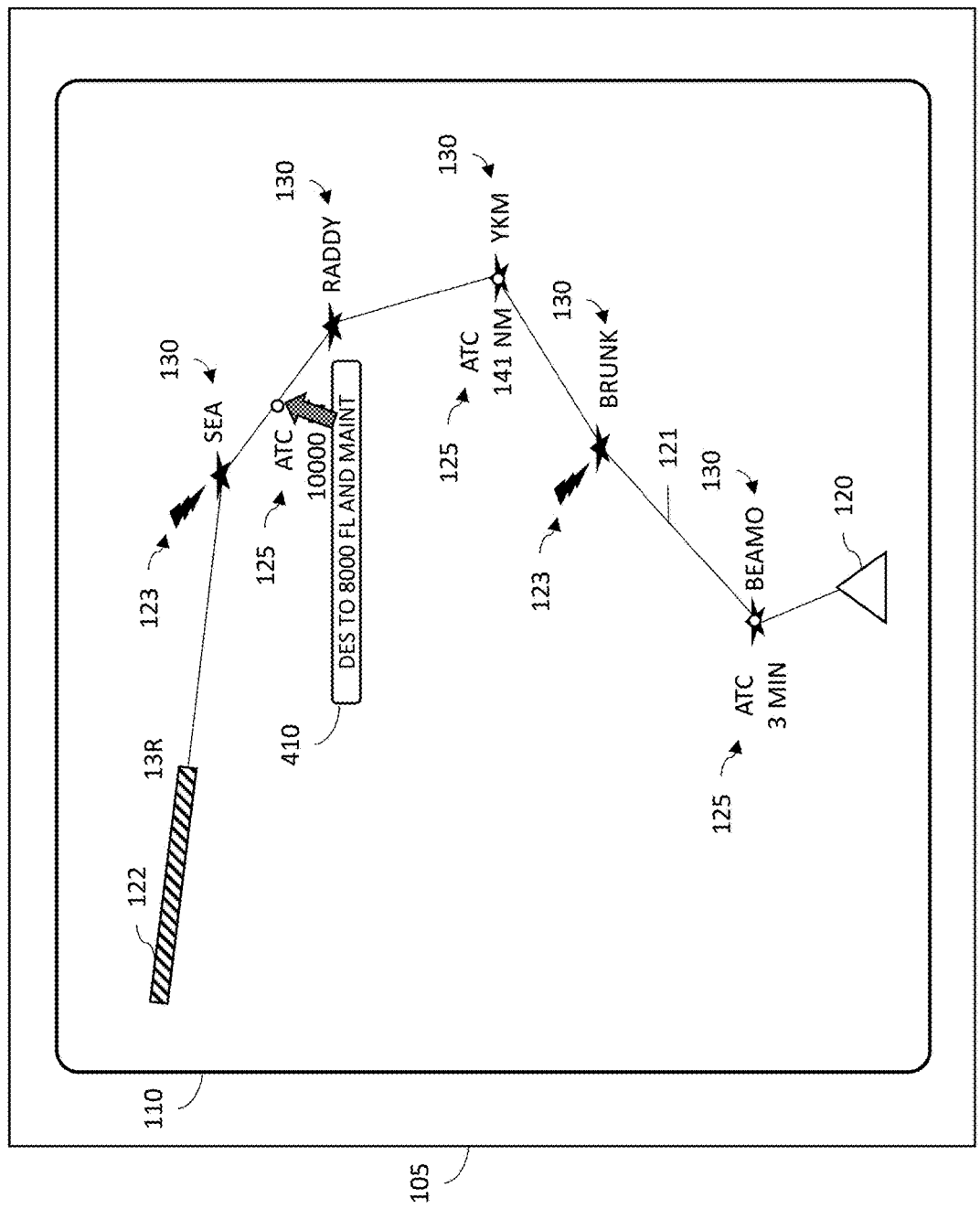

FIGS. 3 and 4 illustrate that prior to reaching an ATC CC message symbol 125 along flight path 121, the pilot may preview the action required selecting an ATC CC message symbol 125 using cursor 240. For example, in FIG. 3, the aircraft 120 is approaching the waypoint BEAMO, but the pilot sees that there is also an ATC CC message symbol 125 proximate to waypoint YMK with a condition predicted to be satisfy in approximately 141 NM. When the pilot selects that ATC CC message symbol 125, an alert 310 showing the action required by the associated conditional clearance action is displayed. Here, alert 310 notifies the pilot that he has agreed to "CONTACT FREQ 112 Hz" upon reaching YKM. Similarly in FIG. 4, the pilot selects the ATC CC message symbol 125 between RADDY and SEA, and alert 410 is displayed notifying the pilot to "DES TO 8000 FL AND MAINT" upon satisfying the condition specified by that conditional clearance.

Figure 5:
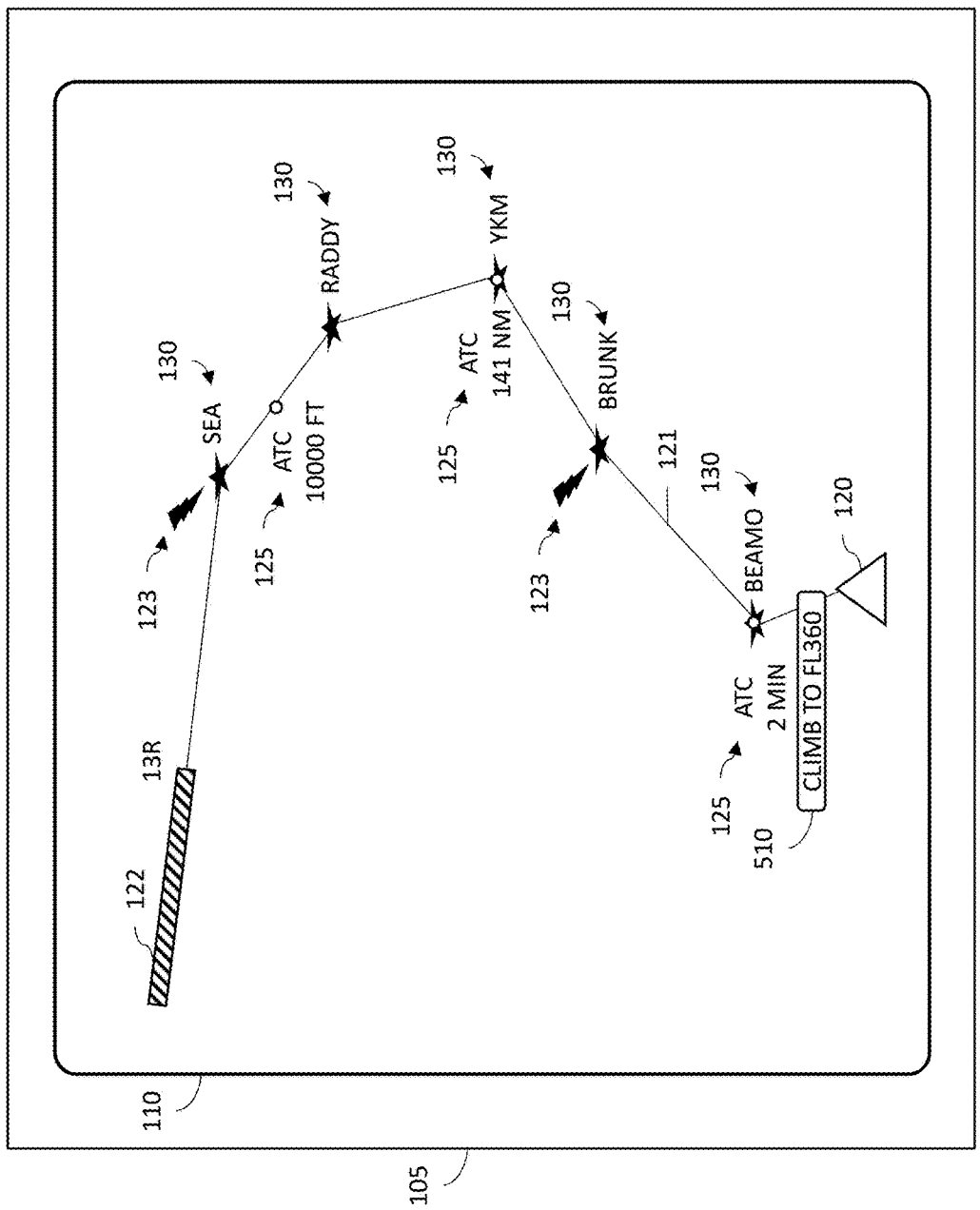

In some embodiments, the flight plan display screen 110 automatically displays the action alert for a conditional clearance once the aircraft comes within a predefined threshold of satisfying the condition. For example, in FIG. 5 the aircraft is now predicted to satisfy the ATC CC condition at BEAMO within the next 2 minutes, which is the alert threshold. Within this threshold, alert 510 is displayed proximate to the ATC CC message symbol 125 at BEAMO, altering the pilot that once the condition is met, the required action is to "CLIMB TO FL360". In some embodiments, multiple thresholds may be utilized. For example, in one embodiment, when the aircraft is within 2 minutes of satisfying the condition, the alert 510 is displayed in green, when the aircraft is within 1 minute of satisfying the condition, the alert 510 is displayed in amber, and when the aircraft has satisfied the condition, the alert 510 is displayed in red. As mentioned above, in different implementations, the thresholds may be based, for example, on a time margin, a distance margin, or an altitude margin, before reaching the condition specified in the ATC CC message. In other embodiments, the brightness of the alert or symbol may indicate how close the aircraft is to satisfying the condition, or blinking, bolding, underlining or other accent may be utilized. In other embodiments, color, brightness, blinking, bolding, underlining, or other accent may be utilized to indicate when a conditional clearance action is to be taken, or when it is almost too late to take the action.

When the aircraft is in air, there are many factors affecting the current state of the aircraft and the accuracy of flight plan predictions. One of the main factors affecting the current state of the aircraft is unplanned winds. Due to unplanned winds (especially cross winds), there are high chances of deviating from the current active flight path laterally and vertically. For example, during a climb phase when there is a vertical track error, predictions can be recomputed from the current vertical position to the cruise altitude and compensate the vertical track error. Lateral track error is possible due to unplanned winds or course change and aircraft can deviate from the path and move outside the active flight plan laterally. Both vertical and lateral track errors may be addressed through tolerances associated with the conditions set forth in an ATC CC message and displays as part of the ATC CC message symbol 125.

Figure 6:
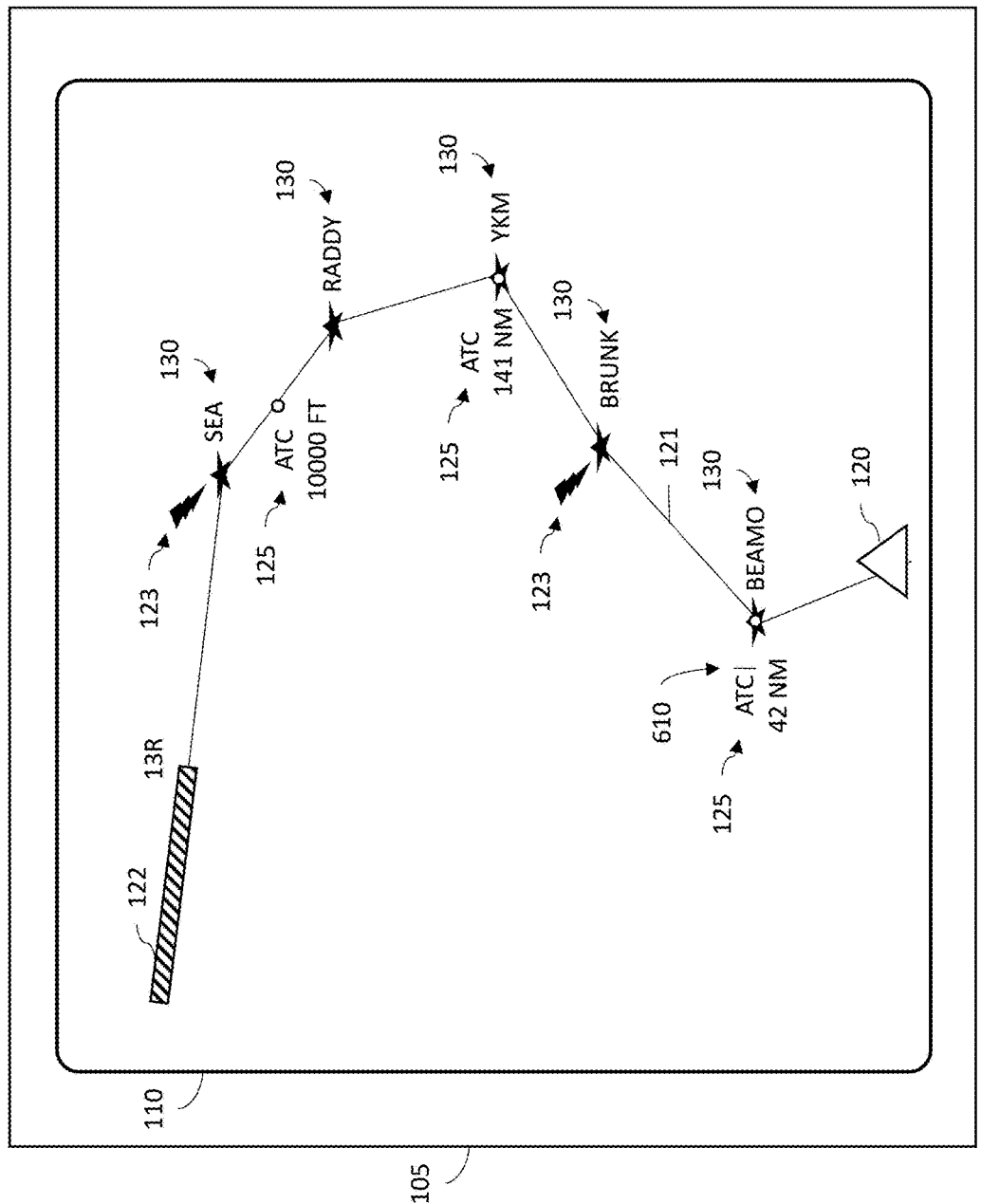
Figure 7:
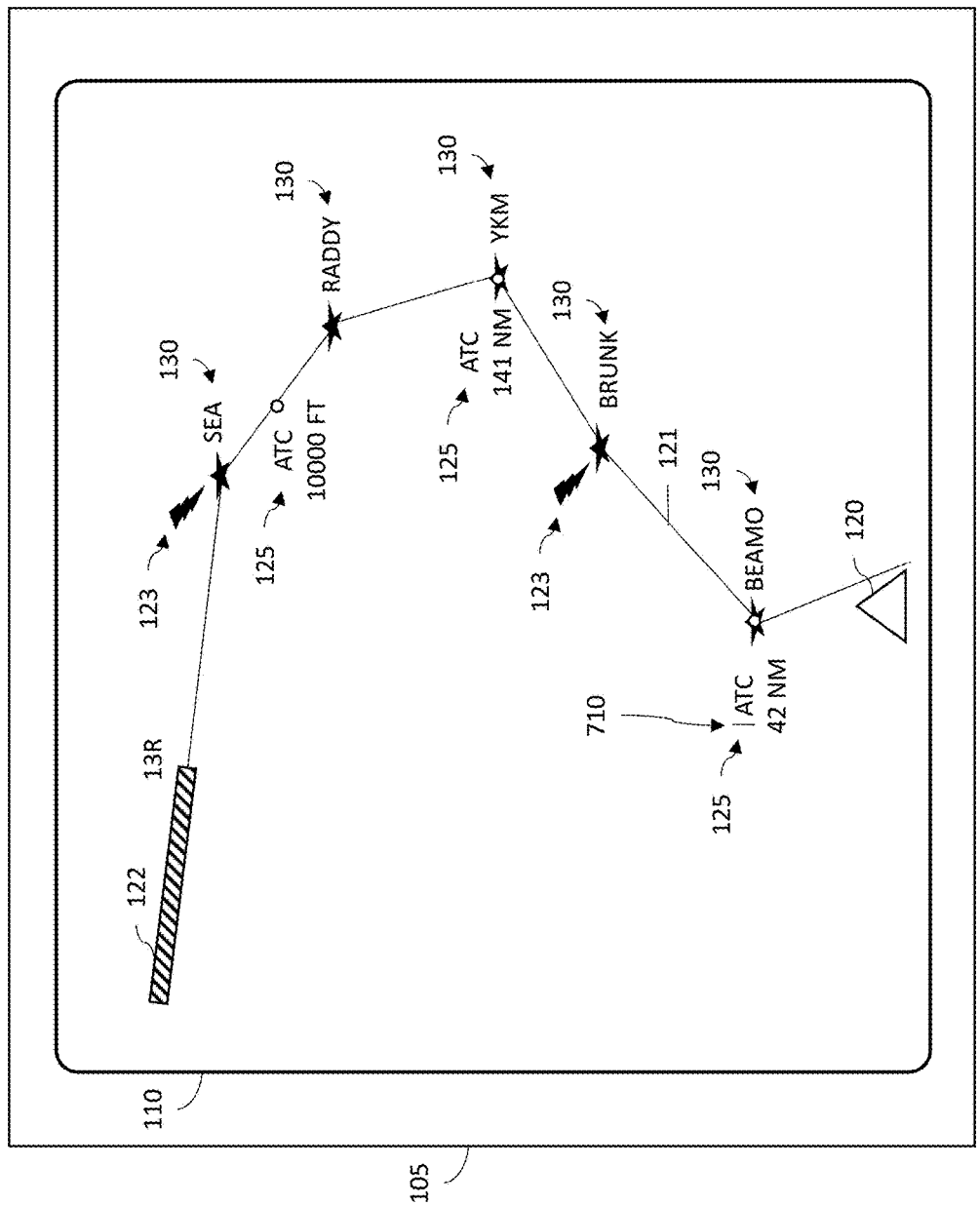

Visual representation of lateral track error towards the right side of an ATC CC point during unplanned wind or course change is illustrated in FIG. 6. In this illustrated scenario, there is an unplanned cross wind and the aircraft (shown at 120 has shifted right laterally from the active planned flightpath 121. To visually indicate the right lateral track error at the predicted conditional clearance point, the ATC CC message symbol 125 is augmented with a vertical bar or other lateral error symbol (shown at 610) next to the ATC CC message symbol 125 on the side where the lateral error is expected. For example, in one embodiment, the absence of any lateral error symbol indicated that the condition will be met within a lateral limit of +/−0.1 NM. A green lateral error symbol 610 can be used to indicate that the lateral track error is between 0.01 NM and 0.1 NM to the right. An amber lateral error symbol 610 can be used to indicate that the lateral track error is between 0.1 NM and 0.4 NM to the right. Similarly, visual representation of lateral track error towards the left side of an ATC CC point during unplanned wind or course change is illustrated in FIG. 7. In this illustrated scenario, there is an unplanned cross wind and the aircraft (shown at 120 has shifted left laterally from the active planned flight path 121. To visually indicate the left lateral track error at the predicted conditional clearance point, the ATC CC message symbol 125 is augmented with a vertical bar or other lateral error symbol (shown at 710) next to the ATC CC message symbol 125 on the side where the lateral error is expected. For example, a green lateral error symbol 710 can be used to indicate that the lateral track error is between 0.01 NM and 0.1 NM to the left. An amber lateral error symbol 710 can be used to indicate that the lateral track error is between 0.1 NM and 0.4 NM to the left.

Figure 8:
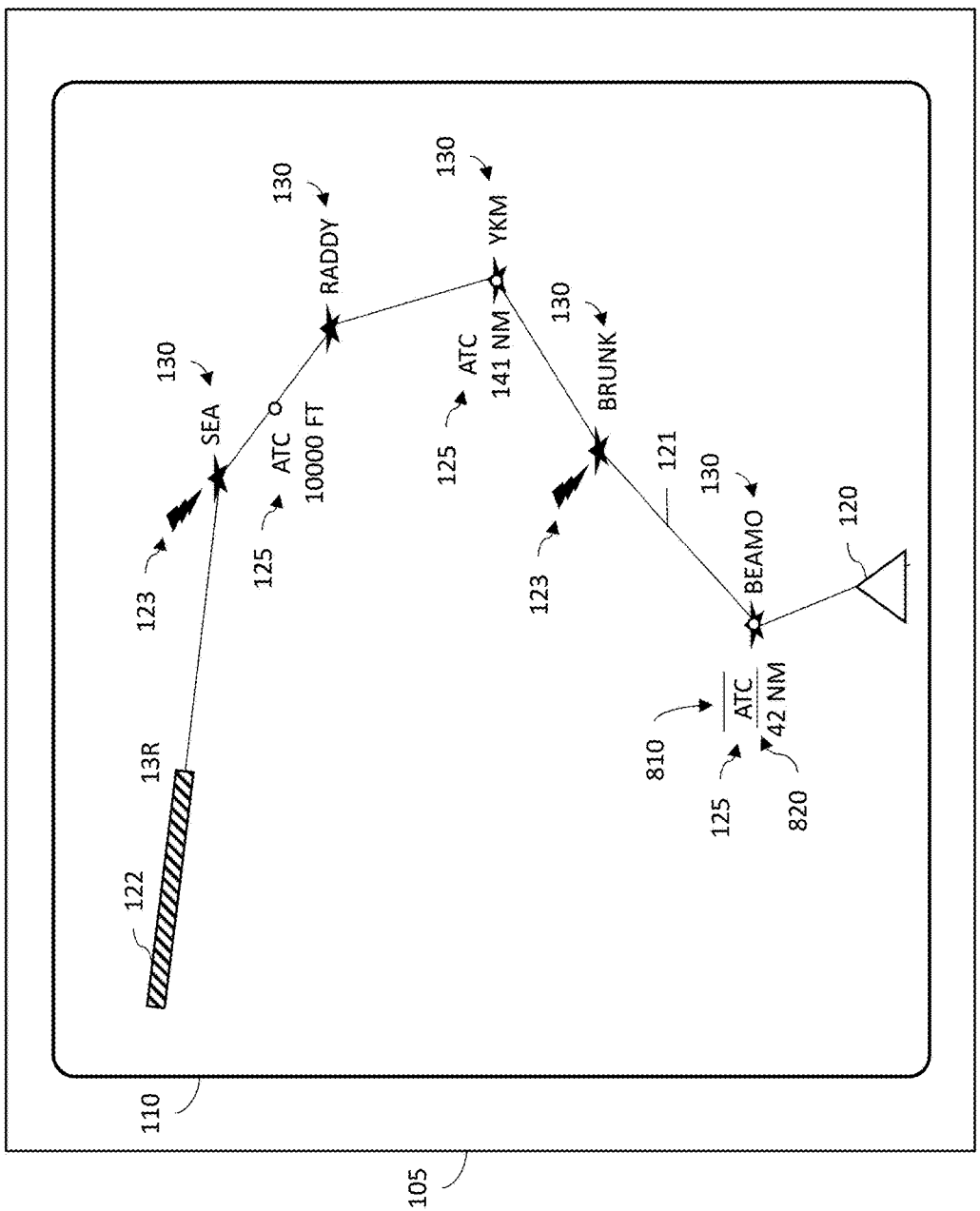

Visual representation of vertical track error, either above or below an ATC CC point due to unplanned wind or course change is illustrated in FIG. 8. To visually indicate the vertical track error above the flight plan at ATC CC point, the ATC CC message symbol 125 is augmented with a horizontal bar or other vertical error symbol (shown at 810) above the ATC CC message symbol 125. To visually indicate the vertical track error below the flight plan at ATC CC point, the ATC CC message symbol 125 is augmented with a horizontal bar or other vertical error symbol (shown at 820) below the ATC CC message symbol 125. For example, in one embodiment, the absence of any vertical error symbol indicated that the condition will be met within a vertical limit of +/−150 feet. A green vertical error symbol 810 can be used to indicate that the vertical track error is between 150 feet and 300 feet above the planned flight path 121. A an amber vertical error symbol 810 can be used to indicate that the vertical track error is between 300 feet and 400 feet above the planned flight path 121. Similarly, a green vertical error symbol 820 can be used to indicate that the vertical track error is between 150 feet and 300 feet below the planned flight path 121. An amber vertical error symbol 820 can be used to indicate that the vertical track error is between 300 feet and 400 feet below the planned flight path 121.

It should also be understood that an ATC CC message symbol 125 may be augmented with a combination of both vertical and lateral error symbols when both vertical and lateral track errors are present.

FIG. 9 is illustrating a contextual uplink message display system 900 of one embodiment of the present disclosure which may be used to implement the flight deck instrument display system 105 in conjunction with generation of a flight plan display screen 110 such as described with any the embodiments described above. As shown in FIG. 9, uplink datalink messages (shown as "ATC Message 915") are transmitted by an Air Traffic Control Station 910 and received by an in-flight aircraft and message elements of the message are processed by on-board avionics such as, but not limited to, its Communication Management Function (CMF) 920 (often also referred to in the avionics industry as the Communication Management System (CMS) or Communications Management Unit (CMU)). Contextual uplink message display system 900 further includes a Contextual Message Monitoring Function 930 coupled to the CMF 920. In various embodiments, one or more aspects of the Contextual Message Monitoring Function 930 may be implemented via a variety of alternate avionics, such as but not limited to the Flight Management Function, Flight Management Computer, Flight Management Unit, Communications Management Unit or Communications Management Function.

Message elements which are not conditional clearances are communicated to the Contextual Message Monitoring Function 930 which determines which point along the aircraft's planned flight path the message is applicable to and provides that information to the flight deck instrumentation display system 105 so that an ATC message symbol 123 may be displayed onto flight path 121 as described above with respect to FIG. 2. Pilot responses to these messages entered via the action buttons 214 in message region 210 of the flight plan display screen 110 are conveyed back to the Communication Management Function 920 for transmission as downlink messages back to air traffic control station 910.

Figure 9A:
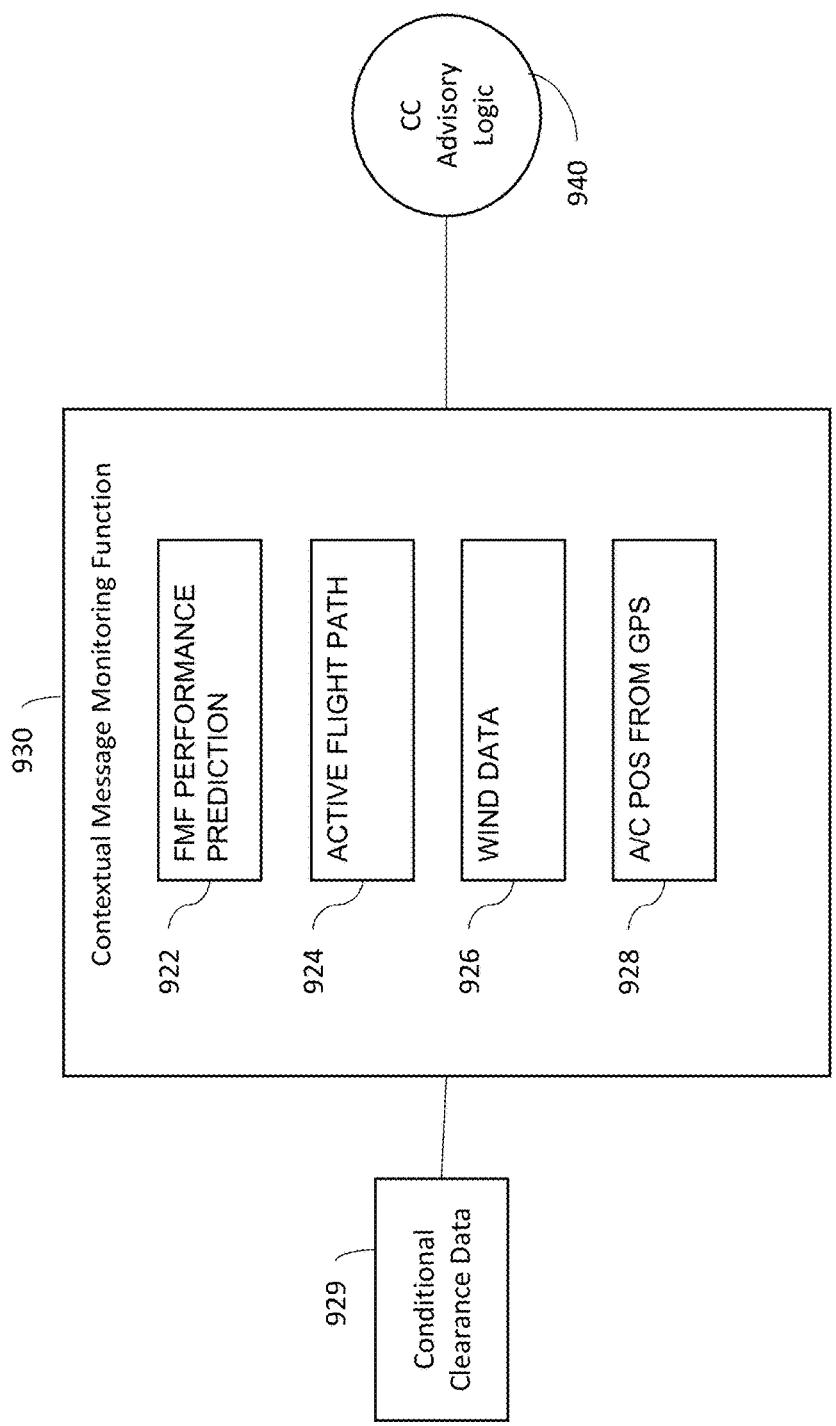

As discussed above, some ATC Messages do include conditional clearance requests. In one embodiment, Communication Management Function 920 tracks when such conditional clearance requests are received and accepted. When they are accepted, as illustrated in FIG. 9A, the conditional clearance data 929 (which includes both the condition and the requested action) is communicated to the Contextual Message Monitoring Function 930. As illustrated in FIG. 9A, the Contextual Message Monitoring Function 930 accesses the aircraft's flight management function (FMF) to input flight performance predictions 922 (e.g., aircraft velocity) and the aircraft's active flight path 924 (which is represented by flight path 121), actual wind data 926 and aircraft position 926 (which may be determined from global navigation satellite system (GNSS) navigation data, for example). With these inputs, Contextual Message Monitoring Function 930 then estimates a prediction as to when and/or where the aircraft will satisfy the condition specified in the conditional clearance data which is used to calibrate the conditional clearance (CC) advisory logic 940. The CC advisory logic 940 then determines which point along the aircraft's planned flight path the condition is expected to occur, along with the current estimated margin between the current aircraft position and that point, as well as any relevant tolerance to accommodate lateral or vertical track errors, and provides that information to the flight deck instrumentation display system 105 so that an ATC CC message symbol 125, action alters (such as shown at 310, 410, 510), or vertical or lateral error symbols may be displayed onto flight path 121 as described above with respect to any of FIGS. 3-8. It should be noted that for some embodiments, an incoming ATC message 915 that includes a conditional clearance may initially be processed by contextual uplink message display system 900 as a standard datalink message until the pilot accepts the conditional clearance, at which point it is processed as described above for conditional clearances. Further in alternate embodiments flight deck instrument display system 105 may process and display only ATC messages 123 or ATC CC messages 125, rather than both. For example, in one embodiment, a pilot may selectively configure contextual uplink message display system 900 to display or not display ATC messages 123, or selectively configure contextual uplink message display system 900 to display or not display ATC CC messages 125.

FIG. 10 is a flow chart illustrating a method 1000 of one embodiment of the present disclosure. The method of FIG. 10 may be used to implement any one or more of the various embodiments discussed above, or otherwise preformed in conjunction with any of those embodiments. As such, options or variations in embodiments discussed above with respect to FIGS. 1-9 and 9A may be applied to method 1000 and vice versa. The method begins at 1010 with receiving an uplink datalink message. For some embodiments, the uplink datalink message is received at the aircraft by a communication management function which may, for example, extract message elements from the uplink datalink message. The uplink datalink message may be, but is not necessarily limited to being, a Controller-pilot datalink communications (CPDLC) datalink message. The method proceeds to 1020 with associating the uplink datalink message with a point of applicability along a planned flight path. The point of applicability may be determined from a waypoint or other position indication communicated within the uplink datalink message. In other embodiments, where the uplink datalink message includes a conditional clearance, the point of applicability may be a position where a condition specified by the conditional clearance is predicted to become satisfied. The method proceeds at 1030 with displaying a representation of the planned flight path on the flight plan display screen and then with 1040 with positioning a symbol on the flight plan display screen along the representation of the planned flight path at a position indicating the point of applicability. By placing the symbol along the flight path display, the pilot is provided with an immediate awareness of where during the flight a particular uplink message is applicable. Further, in situations where the pilot has received multiple uplink messages, the positing of symbols along the flight path display for each of the multiple uplink messages provides the pilot with a better understanding of which messages are more immediately relevant. As described above, the method may further include displaying additional contents of the uplink datalink message on the flight plan display screen when the symbol is selected using a human-machine interface. Also, when the received uplink datalink message includes a conditional clearance request, the position of the symbol can not only indicate a position where a condition specified by the conditional clearance is predicted to become satisfied, but can further communicate a margin until the condition is expected to be met based on current aircraft conditions. In some embodiments, the symbol on the flight plan display screen further includes an action alert when the aircraft comes within a predefined threshold of satisfying the condition, where the action alert displays an action specified by the conditional clearance request. Also, the symbol on the flight plan display screen may further include one or both of a vertical error symbol or a lateral error symbol. The vertical and lateral error symbol symbols, as previously discussed above, indicate a tolerance for satisfying the condition when the aircraft has deviated from the its planned flight path.

EXAMPLE EMBODIMENTS

Example 1 includes an instrument display system for an aircraft, the system comprising: a flight plan display screen that displays a graphical representation of at least a part of an aircraft's planned flight path together with symbology representing a position of the aircraft with respect to the aircraft's planned flight path; wherein the flight plan display screen further displays at least one symbol positioned along the graphical representation of at least a part of the aircraft's planned flight path that indicates a point of applicability for a received uplink datalink message.

Example 2 includes the system of example 1, wherein the at least one symbol is positioned along the aircraft's planned flight path at a waypoint specified in the received uplink datalink message.

Example 3 includes the system of any of examples 1-2, wherein the system further includes a human-machine interface; wherein when a user selects the at least one symbol on the flight plan display screen using the human-machine interface, the flight plan display screen displays contents of the uplink datalink message with the applicable action buttons.

Example 4 includes the system of any of examples 1-3, wherein the point of applicability for the received uplink datalink message is derived from contents of the received uplink datalink message.

Example 5 includes the system of any of examples 1-4, wherein the point of applicability for the received uplink datalink message is selectable by a pilot.

Example 6 includes the system of any of examples 1-5, wherein the received uplink datalink message includes a conditional clearance request.

Example 7 includes the system of example 6, wherein the system further includes a human-machine interface; wherein when a user selects the at least one symbol on the flight plan display screen using the human-machine interface, the flight plan display screen displays an action specified by the conditional clearance request Example 8 includes the system of example 7, wherein the at least one symbol on the flight plan display screen indicates a position where a condition specified by the conditional clearance is predicted to become satisfied.

Example 9 includes the system of example 8, wherein the at least one symbol on the flight plan display screen further indicates a margin until the condition is met based on current aircraft conditions.

Example 10 includes the system of example 9, wherein the margin is expressed as a time margin, a distance margin, or an altitude margin.

Example 11 includes the system of any of examples 8-10, wherein the at least one symbol further includes an action alert when the aircraft comes within a predefined threshold of satisfying the condition, wherein the action alert displays the action specified by the conditional clearance request.

Example 12 includes the system of any of examples 8-11, wherein the at least one symbol further includes one or both of a vertical error symbol and a lateral error symbol; wherein the vertical error symbol and the lateral error symbol indicate a tolerance for satisfying the condition when the aircraft has deviated from the aircraft's planned flight path.

Example 13 includes the system of any of examples 1-12, wherein the flight plan display screen is implemented in one of either: on-board aircraft avionics; or an air traffic control center.

Example 14 includes a method for contextual displaying uplink messages on a flight plan display screen, the method comprising: receiving an uplink datalink message; associating the uplink datalink message with a point of applicability along a planned flight path; displaying a representation of the planned flight path on the flight plan display screen; positioning a symbol on the flight plan display screen along the representation of the planned flight path at a position indicating the point of applicability.

Example 15 includes the method of examples 14, further comprising: displaying additional contents of the uplink datalink message on the flight plan display screen when the symbol is selected using a human-machine interface.

Example 16 includes the method of any of examples 14-15, wherein the received uplink datalink message includes a conditional clearance request.

Example 17 includes the method of example 16, wherein the symbol indicates a position where a condition specified by the conditional clearance is predicted to become satisfied.

Example 18 includes the method of any of examples 16-17, wherein the symbol on the flight plan display screen further indicates a margin until the condition is met based on current aircraft conditions.

Example 19 includes the method of any of examples 16-18, wherein the symbol on the flight plan display screen further includes an action alert when the aircraft comes within a predefined threshold of satisfying the condition, wherein the action alert displays an action specified by the conditional clearance request Example 20 includes the method of any of examples 16-19, wherein the symbol on the flight plan display screen further includes one or both of a vertical error symbol and a lateral error symbol; wherein the vertical error symbol and the lateral error symbol indicate a tolerance for satisfying the condition when the aircraft has deviated from the aircraft's planned flight path.

In various alternative embodiments, system elements, processes, or examples described throughout this disclosure, such as but not limited to the Contextual Message Monitoring Function, the conditional clearance (CC) advisory logic, the flight deck instrument display system or other hardware used to generate the flight plan display screen and symbology disclosed herein, may be implemented on one or more computer systems, field programmable gate array (FPGA), or similar devices comprising a processor executing code to realize those elements, processes, or examples, said code stored on a non-transient data storage device. Therefore other embodiments of the present disclosure may include elements comprising program instructions resident on computer readable media which when implemented by such computer systems, enable them to implement the embodiments described herein. As used herein, the term "computer readable media" refers to tangible memory storage devices having non-transient physical forms. Such non-transient physical forms may include computer memory devices, such as but not limited to punch cards, magnetic disk or tape, any optical data storage system, flash read only memory (ROM), non-volatile ROM, programmable ROM (PROM), erasable-programmable ROM (E-PROM), random access memory (RAM), or any other form of permanent, semi-permanent, or temporary memory storage system or device having a physical, tangible form. Program instructions include, but are not limited to computer-executable instructions executed by computer system processors and hardware description languages such as Very High Speed Integrated Circuit (VHSIC) Hardware Description Language (VHDL).

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. An instrument display system for an aircraft, the system comprising:
   a flight plan display screen that displays a graphical representation of at least a part of an aircraft's planned flight path together with symbology representing a position of the aircraft with respect to the aircraft's planned flight path;
   wherein the flight plan display screen further displays at least one symbol positioned along the graphical representation of at least a part of the aircraft's planned flight path, wherein the flight plan display screen locates the at least one symbol at a position that indicates a point of applicability along the aircraft's planned flight path for a received uplink datalink message;

wherein the received uplink datalink message includes a conditional clearance request; and wherein the at least one symbol on the flight plan display screen indicates a margin until a condition specified by the conditional clearance request is met based on current aircraft conditions.

2. The system of claim 1, wherein the at least one symbol is positioned along the aircraft's planned flight path at a waypoint specified in the received uplink datalink message.

3. The system of claim 1, wherein the system further includes a human-machine interface;

wherein when a user selects the at least one symbol on the flight plan display screen using the human-machine interface, the flight plan display screen displays contents of the uplink datalink message with one or more applicable action buttons.

4. The system of claim 1, wherein the point of applicability for the received uplink datalink message is derived from contents of the received uplink datalink message.

5. The system of claim 1, wherein the point of applicability for the received uplink datalink message is selectable by a pilot.

6. The system of claim 1, wherein the system further includes a human-machine interface;

wherein when a user selects the at least one symbol on the flight plan display screen using the human-machine interface, the flight plan display screen displays an action specified by the conditional clearance request.

7. The system of claim 1, wherein the at least one symbol on the flight plan display screen indicates a position where the condition specified by the conditional clearance request is predicted to become satisfied.

8. The system of claim 7, wherein the at least one symbol further includes an action alert when the aircraft comes within a predefined threshold of satisfying the condition, wherein the action alert displays the action specified by the conditional clearance request.

9. The system of claim 1, wherein the margin is expressed as a time margin, a distance margin, or an altitude margin.

10. The system of claim 1, wherein the at least one symbol further includes one or both of a vertical error symbol and a lateral error symbol;

wherein the vertical error symbol and the lateral error symbol indicate a tolerance for satisfying the condition when the aircraft has deviated from the aircraft's planned flight path.

11. The system of claim 1, wherein the flight plan display screen is implemented in one of either:

on-board aircraft avionics; or an air traffic control center.

12. A method for contextual displaying uplink messages on a flight plan display screen, the method comprising:

receiving an uplink datalink message;

associating the uplink datalink message with a point of applicability along a planned flight path;

displaying a representation of the planned flight path on the flight plan display screen; and positioning a symbol on the flight plan display screen along the representation of the planned flight path at a position indicating the point of applicability;

wherein the received uplink datalink message includes a conditional clearance request; and wherein the at least one symbol on the flight plan display screen indicates a margin until a condition specified by the conditional clearance request is met based on current aircraft conditions.

13. The method of claim 12, further comprising:

displaying additional contents of the uplink datalink message on the flight plan display screen when the symbol is selected using a human-machine interface.

14. The method of claim 12, wherein the symbol indicates a position where a condition specified by the conditional clearance request is predicted to become satisfied.

15. The method of claim 12, wherein the symbol on the flight plan display screen further includes an action alert when the aircraft comes within a predefined threshold of satisfying the condition, wherein the action alert displays an action specified by the conditional clearance request.

16. The method of claim 12, wherein the symbol on the flight plan display screen further includes one or both of a vertical error symbol and a lateral error symbol;

wherein the vertical error symbol and the lateral error symbol indicate a tolerance for satisfying the condition when the aircraft has deviated from the aircraft's planned flight path.

* * * * *